(12) United States Patent
Seegert

(10) Patent No.: US 6,862,874 B2
(45) Date of Patent: Mar. 8, 2005

(54) DISCHARGE STOPPER UNITS FOR MOWER DECKS

(75) Inventor: Brian David Seegert, Hartford, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/127,873

(22) Filed: Apr. 22, 2002

(65) Prior Publication Data

US 2003/0196423 A1 Oct. 23, 2003

(51) Int. Cl.[7] .................. A01D 43/00; A01D 43/06
(52) U.S. Cl. ......................... 56/202; 56/320.2
(58) Field of Search ................. 56/202, 320.2, 56/14.7, 255, 10.4, 194–201, 203–206, 13.4, 17.5

(56) References Cited

U.S. PATENT DOCUMENTS

| | | | | |
|---|---|---|---|---|
| 3,423,918 A | * | 1/1969 | Siwek | 56/202 |
| 3,636,686 A | * | 1/1972 | Meyer et al. | 56/320.2 |
| 3,726,069 A | * | 4/1973 | Cope | 56/202 |
| 3,805,499 A | * | 4/1974 | Woelffer et al. | 56/202 |
| 3,872,656 A | * | 3/1975 | Dahl | 56/202 |
| 3,893,284 A | * | 7/1975 | Thon et al. | 56/202 |
| 3,949,540 A | * | 4/1976 | Christopherson et al. | 56/202 |
| 4,008,559 A | | 2/1977 | Lessig, III et al. | |
| 4,043,102 A | * | 8/1977 | Uhlinger et al. | 56/17.4 |
| 4,099,366 A | | 7/1978 | Peterson | |
| 4,189,904 A | | 2/1980 | Paker | |
| 4,214,424 A | * | 7/1980 | Gobin | 56/202 |
| 4,326,370 A | * | 4/1982 | Thorud | 56/202 |
| 4,435,949 A | | 3/1984 | Heismann | |
| 4,726,177 A | * | 2/1988 | McGoughy | 56/202 |
| 4,726,178 A | | 2/1988 | Mallaney et al. | |
| 4,738,091 A | | 4/1988 | Kulak et al. | |
| 4,747,259 A | | 5/1988 | Kline et al. | |
| 4,774,802 A | | 10/1988 | Azhelll | |
| 4,785,612 A | | 11/1988 | Morishita et al. | |

(List continued on next page.)

FOREIGN PATENT DOCUMENTS

| | | |
|---|---|---|
| DE | 198 38 769 A1 | 8/1998 |
| DE | 29816120 U 1 | 12/1998 |
| DE | 0 981 943 A1 | 8/1999 |
| EP | 0 664 945 A2 | 7/1990 |
| EP | 0 532 068 B1 | 7/1992 |
| EP | 0 687 407 A1 | 6/1995 |
| WO | WO 94/10827 | 5/1994 |
| WO | WO 96/20584 | 7/1996 |

OTHER PUBLICATIONS

"Castorama" brochure, Sep. 30, 1996.
Photo of Castelgarden prototype mulch plug, Jun. 18, 2001.
"Bison" brochure by Etesia SCA, undated.
"King Grills" brochure by Grillo, undated.
"Outils Wolf" brochure, 1991.
Brochure by Jonsered, undated.
Instruction Manual by Jonsered, Dec. 3, 1998.

*Primary Examiner*—Arpad Fabian Kovacs
(74) *Attorney, Agent, or Firm*—Bell, Boyd & Lloyd, LLC

(57) ABSTRACT

The present invention relates to a discharge stopper unit for a mowing machine having a mower deck. The discharge stopper unit has a discharge stopper adapted to block a discharge opening in the mower deck and an arm connected to the discharge stopper. Preferably, the arm has a biasing member which produces a securing force on the discharge stopper.

34 Claims, 6 Drawing Sheets

U.S. PATENT DOCUMENTS

| | | | |
|---|---|---|---|
| 4,817,372 | A | 4/1989 | Toda et al. |
| 4,823,541 | A | 4/1989 | Hewson |
| 4,856,265 | A | 8/1989 | Wolf |
| 4,864,808 | A | 9/1989 | Weber |
| 4,881,362 | A | 11/1989 | Parker et al. |
| 4,887,418 | A | 12/1989 | Pelletier |
| 4,887,420 | A | 12/1989 | Cerny, Jr. et al. |
| 4,890,446 | A | 1/1990 | Israel |
| 4,897,988 | A | 2/1990 | Schweitz et al. |
| 4,899,526 | A | 2/1990 | Harris |
| 4,903,465 | A | 2/1990 | Hughes |
| 4,916,887 | A | 4/1990 | Mullet et al. |
| 4,932,194 | A | 6/1990 | Allen |
| 4,938,011 | A | 7/1990 | Pernia |
| 4,951,449 | A | 8/1990 | Thorud |
| 4,962,635 | A | 10/1990 | Jones et al. |
| 4,972,628 | A | 11/1990 | Smith |
| 4,986,062 | A | 1/1991 | Hill |
| 4,996,829 | A | 3/1991 | Saitoh et al. |
| 4,999,984 | A | 3/1991 | Pelletier |
| 5,003,757 | A | 4/1991 | Hill |
| 5,003,758 | A | 4/1991 | Bernstein |
| 5,033,260 | A | 7/1991 | Jerry |
| 5,035,108 | A | 7/1991 | Meyer et al. |
| 5,040,364 | A | 8/1991 | Deegan |
| 5,042,241 | A | 8/1991 | Boylston et al. |
| 5,048,279 | A | 9/1991 | Badawey et al. |
| 5,063,708 | A | 11/1991 | Smith |
| 5,070,686 | A | 12/1991 | Isaka et al. |
| 5,074,106 | A | 12/1991 | Di Paolo |
| 5,090,183 | A | 2/1992 | Thorud et al. |
| 5,117,616 | A | 6/1992 | McLane |
| 5,129,217 | A | 7/1992 | Loehr |
| 5,133,175 | A | 7/1992 | Dumbrell |
| 5,157,908 | A | 10/1992 | Sebben et al. |
| 5,179,823 | A | 1/1993 | Pace |
| 5,179,824 | A | 1/1993 | Ridge et al. |
| 5,181,804 | A | 1/1993 | Wysong et al. |
| 5,189,870 | A | 3/1993 | Hohnl |
| 5,191,756 | A | 3/1993 | Kuhn |
| 5,195,311 | A | 3/1993 | Holland |
| 5,205,112 | A | 4/1993 | Tillotson et al. |
| 5,214,906 | A | 6/1993 | Saki et al. |
| 5,224,326 | A | 7/1993 | Dunn |
| 5,231,827 | A | 8/1993 | Connolly et al. |
| 5,245,817 | A | 9/1993 | Hohnl |
| 5,251,430 | A | 10/1993 | Matsumoto et al. |
| 5,267,429 | A | 12/1993 | Kettler et al. |
| 5,269,125 | A | 12/1993 | Langley, Sr. et al. |
| 5,284,007 | A | 2/1994 | Poe et al. |
| 5,299,888 | A | 4/1994 | Wysong et al. |
| 5,327,710 | A | 7/1994 | Plamper et al. |
| 5,337,545 | A | 8/1994 | Butler |
| 5,355,666 | A | 10/1994 | McDonner et al. |
| 5,410,867 | A | 5/1995 | Plamper et al. |
| 5,442,902 | A | 8/1995 | Mosley et al. |
| 5,488,821 | A | 2/1996 | McCunn et al. |
| 5,542,243 | A | 8/1996 | Yuki et al. |
| 5,581,987 | A | 12/1996 | Schuyler |
| 5,703,450 | A | 12/1997 | Josephs |
| 5,751,124 | A | 5/1998 | Josephs |
| 5,765,346 | A | 6/1998 | Benter et al. |
| 5,791,132 | A | 8/1998 | Wiedenmann |
| 5,826,417 | A | 10/1998 | Evans |
| 5,839,772 | A | 11/1998 | Toole |
| 5,960,619 | A | 10/1999 | Seidel et al. |
| 6,062,013 | A | 5/2000 | Wolske |
| 6,085,508 | A | 7/2000 | Miatt et al. |
| 6,101,794 | A | 8/2000 | Christopherson et al. |
| 6,138,405 | A | 10/2000 | Matz |

\* cited by examiner

DISCHARGE STOPPER UNITS FOR MOWER DECKS

BACKGROUND OF THE INVENTION

The present invention generally relates to mowing machines. More specifically, the present invention relates to discharge stopper units which plug discharge openings for mowing machine mower decks to mulch cut materials.

Lawn tractors, push mowers and other mowing machines which cut grass, weeds and leaves are well known. Depending upon the type of mower assembly, these machines may discharge the cut material back on the ground or into a collection bag or hopper. In certain mowing machines, the mower deck and/or blades are adapted to mulch or finely chop the material. Returning this finely chopped material to the ground has been found to naturally fertilize lawns and vegetation. Also, mulching can eliminate the need to collect and dispose of the cut materials.

Existing mowing machines provide mechanisms for discharging cut materials. One mechanism enables users to discharge cut material into a hopper, and another mechanism enables users to discharge cut material to the ground. The latter mechanism typically includes a discharge cover or plug which a user installs at the discharge opening on the mower deck.

The process of installing and uninstalling the discharge plug can be awkward, inconvenient and relatively time consuming. The installer may have to disassemble portions of the mowing machine. Also, the installer may have to reach the discharge opening with his/her hand which can be difficult. Further, once the discharge plug is installed, the discharge plug tends to vibrate, and in some instances, the discharge plug can dislodge unless it is held in place. These problems are especially apparent in rear discharge lawn tractors.

Mechanisms have been used to attempt to hold the discharge plugs in place. Such mechanisms include an elastic cord or a pin to hold the plug in place. However, such mechanisms can be unreliable in securing the discharge plug in place. In addition, such mechanisms can be relatively awkward, inconvenient and time consuming to use. Accordingly, there is a need to overcome such disadvantages.

SUMMARY OF THE INVENTION

The present invention generally relates to mowing machines. More specifically, the present invention relates to discharge stopper units which plug discharge openings for mowing machine mower decks to mulch cut materials.

The discharge stopper unit, in one embodiment of the present invention, includes an arm which is preferably spring-loaded and pivotally connected to a discharge stopper. The discharge stopper seats in a discharge opening of a mower deck to prevent cut material from entering a discharge chute. The cut material, for example, remains in the cutting area of the mower deck to be mulched and then is discharged to the ground. The arm of the discharge stopper unit extends from the discharge stopper into the discharge chute. Preferably, the arm extends through the discharge chute to a chute exit which would otherwise guide cut material to a material collection unit. The end of the arm opposite the discharge stopper can serve as a handle for the user to grasp and install the discharge stopper onto the mower deck. Also, the user can removably connect the end of the arm opposite the discharge stopper to a portion of the mowing machine in order to secure the discharge stopper unit in place. Preferably, the arm is spring-loaded relative to the discharge stopper in order to secure the discharge stopper in place. The arm extends into and preferably through the discharge chute for ease of installing and removing the discharge stopper.

The mowing machine can include any machine which cuts or mulches grass, plants, leaves or other material on the ground, including, without limitation, riding mowing machines, rear and side discharge lawn tractors and walk-behind or walk-along mowing machines. The discharge material produced by such a mowing machine can be discharged directly onto the ground or into a collector such as a hopper. The term "discharge material" includes any material which flows from an opening in a mower deck into a discharge chute and exits the discharge chute.

In one embodiment the discharge stopper unit is adapted to be removably installed in a mower assembly which is connected to a mowing machine frame. The mower assembly generally includes a mower deck which cuts grass and other materials, and a discharge chute which directs the discharge material from the mower deck onto the ground or into a collector such as a bag or hopper.

The mower deck includes a discharge wall, which defines a discharge opening, and one or more cutting blades. Depending upon the type of mowing machine, the discharge opening can have any suitable position on the mower deck, such as a position at the side or rear of the mower deck. The discharge chute can include any suitable material director, tube or pipe having any suitable shape which directs discharge material into the hopper.

The discharge stopper unit, in one embodiment, includes: (a) a cover, plug, mulch plug or other discharge stopper adapted to block the flow of material from the discharge opening; (b) an arm pivotally connected to the discharge stopper; and (c) a support member adapted to be connected to the mowing machine frame. The discharge stopper includes a body and an arm positioning wall which defines an arm positioning slot for the arm. The body of the discharge stopper preferably includes a plurality of guide members which facilitate the proper alignment and placement of the discharge stopper onto the mower deck.

The arm of the discharge stopper unit includes an extension member having a first end which is pivotally connected to the discharge stopper and a second end which is adapted to engage the support member. The first end of arm includes a biasing member which biases the discharge stopper onto the mower deck, and a hinge which hingedly connects the arm to the discharge stopper.

The biasing member includes a spring frame which slidably receives the extension member and is rigidly connected to the hinge. The biasing member also includes a spring which is received by the extension member and is held in place on the spring frame by the extension member. The lower wall, the spring frame and the spring pin ensure that the spring will provide a minimum predetermined biasing force to the discharge stopper at all times. This force secures the discharge stopper to the mower deck as described below. The arm also includes a hinge connected to the biasing member. The hinge is rotatably mounted to a hinge pin in the discharge stopper. The hinge enables the arm to pivot relative to the discharge stopper.

The second end of the arm includes an extension member connected to an engaging member which removably engages the support member. The engaging member preferably has a U-shape or curve shape which facilitates the removable engagement of the arm to the support member.

In order to change a mowing machine from collecting cut material to mulching or discharging the cut material to the ground, the user must install the discharge stopper unit in the mower assembly. To do so, the user first lowers the mower deck. The user picks up the arm and inserts the discharge stopper into and through the discharge chute. While gripping the extension member, the user properly places the discharge stopper over the discharge opening. Once the discharge stopper is properly seated or positioned on the mower deck, the user pushes the extension member or handle toward the discharge stopper and engages the engaging member with the support member. At this point, the spring generates a force which secures the discharge stopper onto the mower deck. The discharge stopper prevents the flow of material from the discharge opening. Consequently, the mower deck deposits the cut or mulched material to the ground as the user operates the mowing machine. The user can convert the mowing machine back to collecting or discharging cut material by reversing these steps.

The arm of the discharge stopper unit can contribute to the ease of installation and removal of the unit. For example, the arm allows the user to easily insert the discharge stopper through the discharge chute to the mower deck discharge opening. The user does not have to reach with his/her hand all the way to the discharge opening which could be quite difficult. Furthermore, the user's need to bend, squat or take awkward positions when installing the discharge stopper is minimized.

It is therefore an advantage of the present invention to provide discharge stopper units for mower decks.

Another advantage of the present invention is to reliably secure discharge stoppers to mower decks.

Yet another advantage of the present invention is to facilitate the installation of discharge stoppers onto mower decks.

Still another advantage of the present invention is to provide discharge stoppers which have an installation and removal handle that extends into a discharge chute of a mowing machine.

Additional features and advantages of the present invention are described in, and will be apparent from, the following Detailed Description of the Invention and the figures.

DETAILED DESCRIPTION OF THE INVENTION

Figure 1:
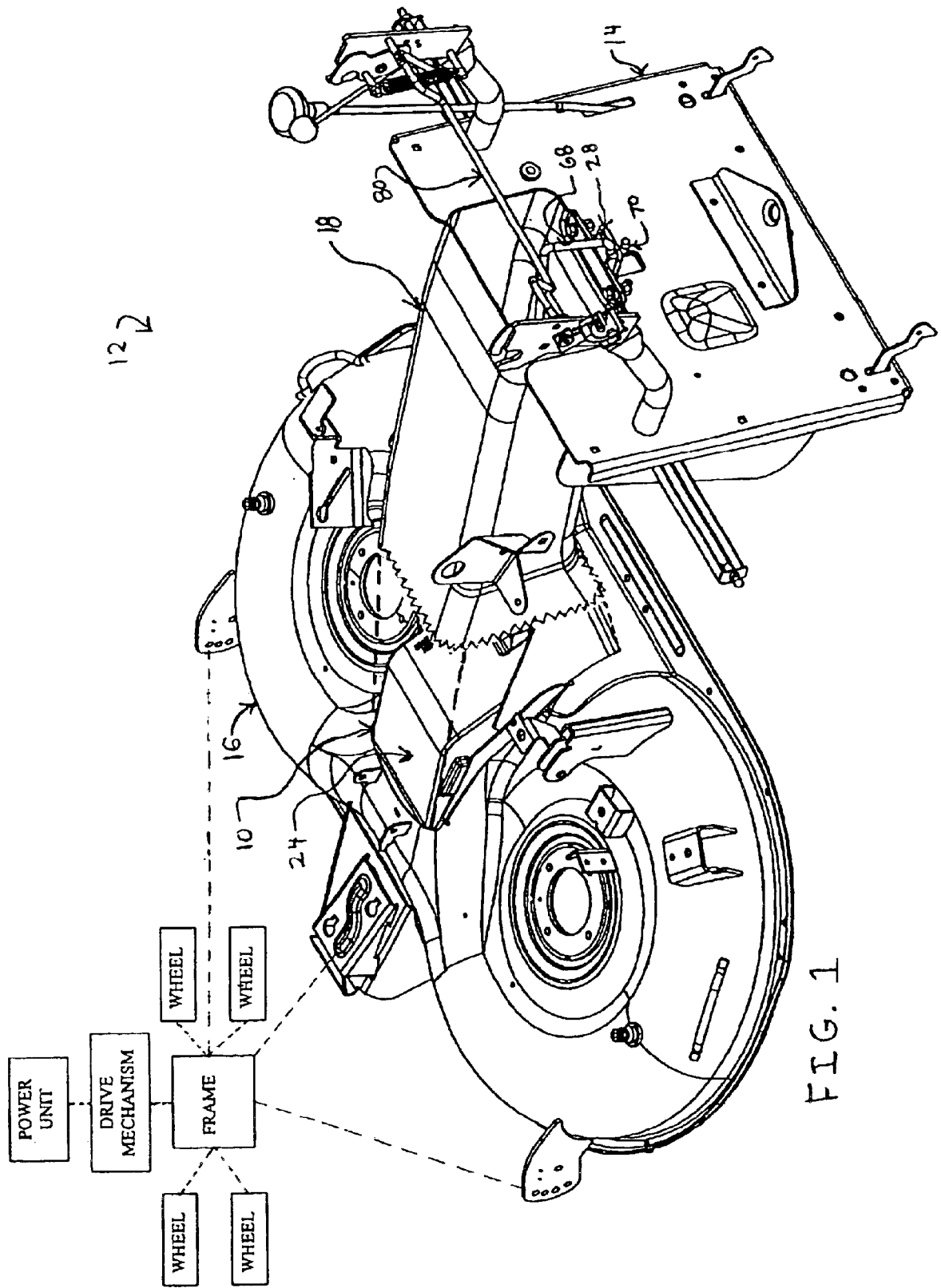
FIG. 1 is a perspective view of the mower assembly, discharge stopper and discharge chute (in fragmentary view) in one embodiment of the present invention.
Figure 2:
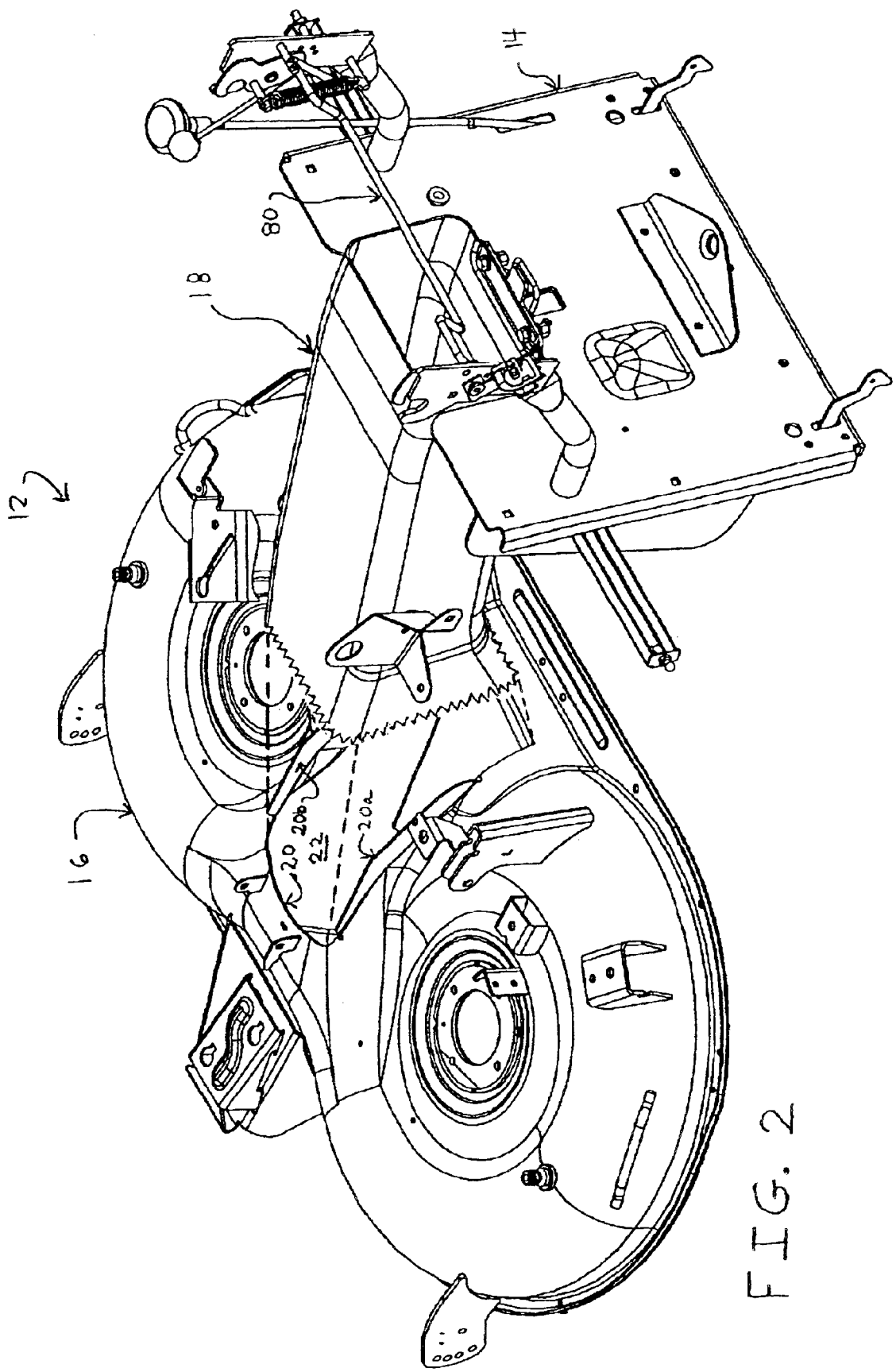
FIG. 2 is a perspective view of the mower assembly, discharge opening and discharge chute (in fragmentary view) in one embodiment of the present invention.

With reference to FIGS. 1 through 4, in one embodiment the discharge stopper unit 10 of the present invention is adapted to be installed in a mowing machine (not shown), preferably a lawn tractor such as a rear discharge lawn tractor. Specifically, the discharge stopper unit 10 is adapted to be removably installed in a mower assembly 12 which is connected to a mowing machine frame 14 of the mowing machine. The mower assembly 12 generally includes a mower deck 16 which cuts and mows grass, plants, leaves and other materials. The mower assembly 12 also includes a discharge chute 18 which directs the discharge material from the mower deck 16 to the rear of the mowing machine where the material can be discharged to the ground or into a collector such as a bag or hopper (not shown). Preferably, one or more hoppers are connected to the mowing machine frame 14 in order to receive the material discharged from the discharge chute 18. In the mower assembly 12 illustrated in FIGS. 1 and 2, a fragmentary view of the discharge chute 18 is shown so that the discharge stopper unit 10 can be best illustrated. It should be understood that the discharge chute 18 extends to the mower deck 16, covering the discharge stopper unit 10.

The mower deck 16 includes a discharge wall 20, which defines a discharge opening 22, and one or more cutting blades (not shown). As the blades cut the material, the cut material flows through discharge opening 22 when discharge stopper unit 10 is not installed on the mower deck 16. The discharge wall 20 preferably includes guide walls 20a and 20b which, as described below, assist the user in properly and quickly installing the discharge stopper unit 10 on the mower deck 16.

The discharge chute 18 can include any suitable material director, tube or pipe having any suitable shape which directs discharge material into the hopper. Preferably, the discharge chute is a rectangular shaped tube constructed of a suitable material such as a hard rubber, polymer-based material or plastic.

Figure 3:
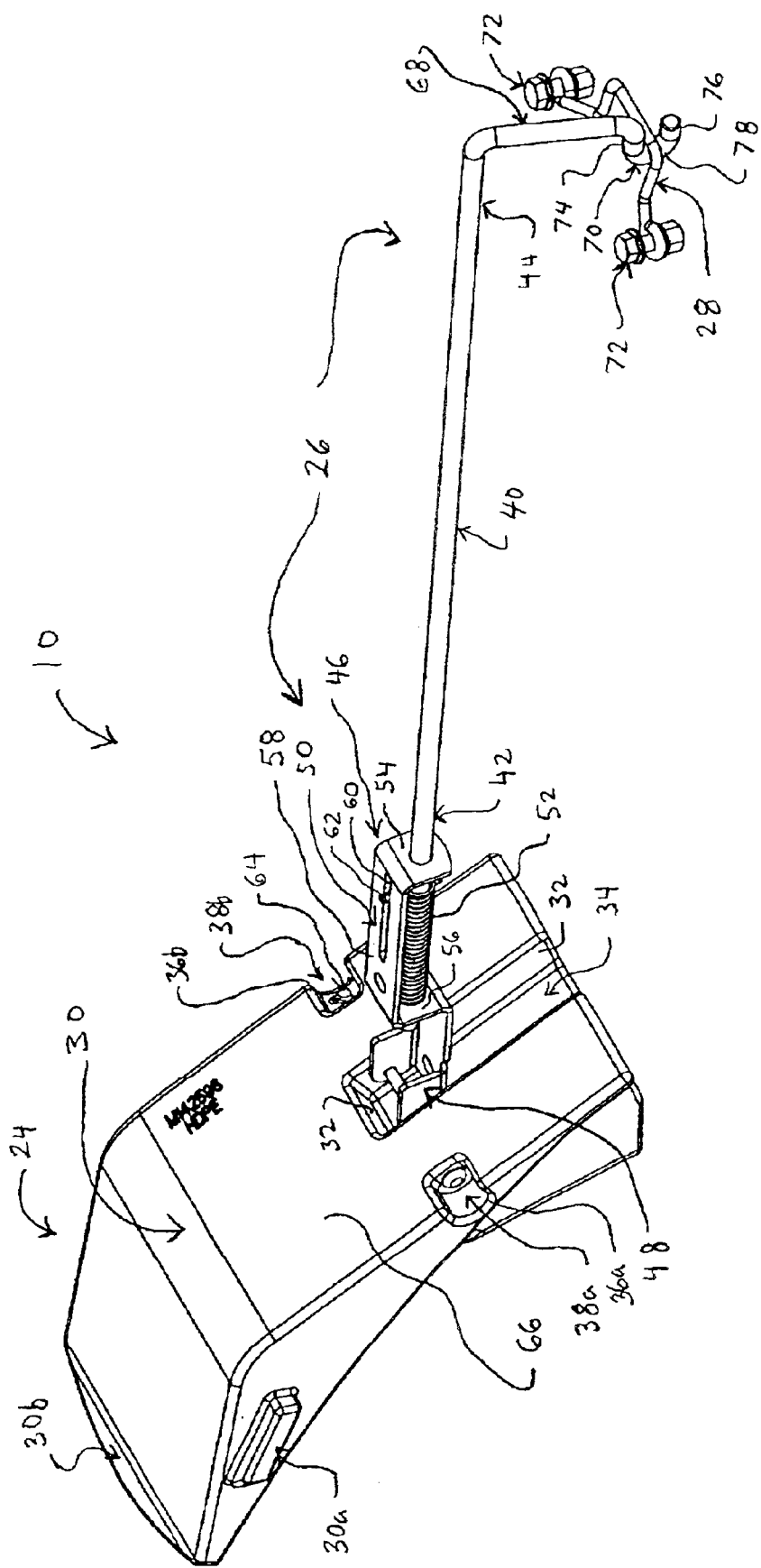
FIG. 3 is a perspective view of the discharge stopper unit in one embodiment of the present invention.
Figure 4:
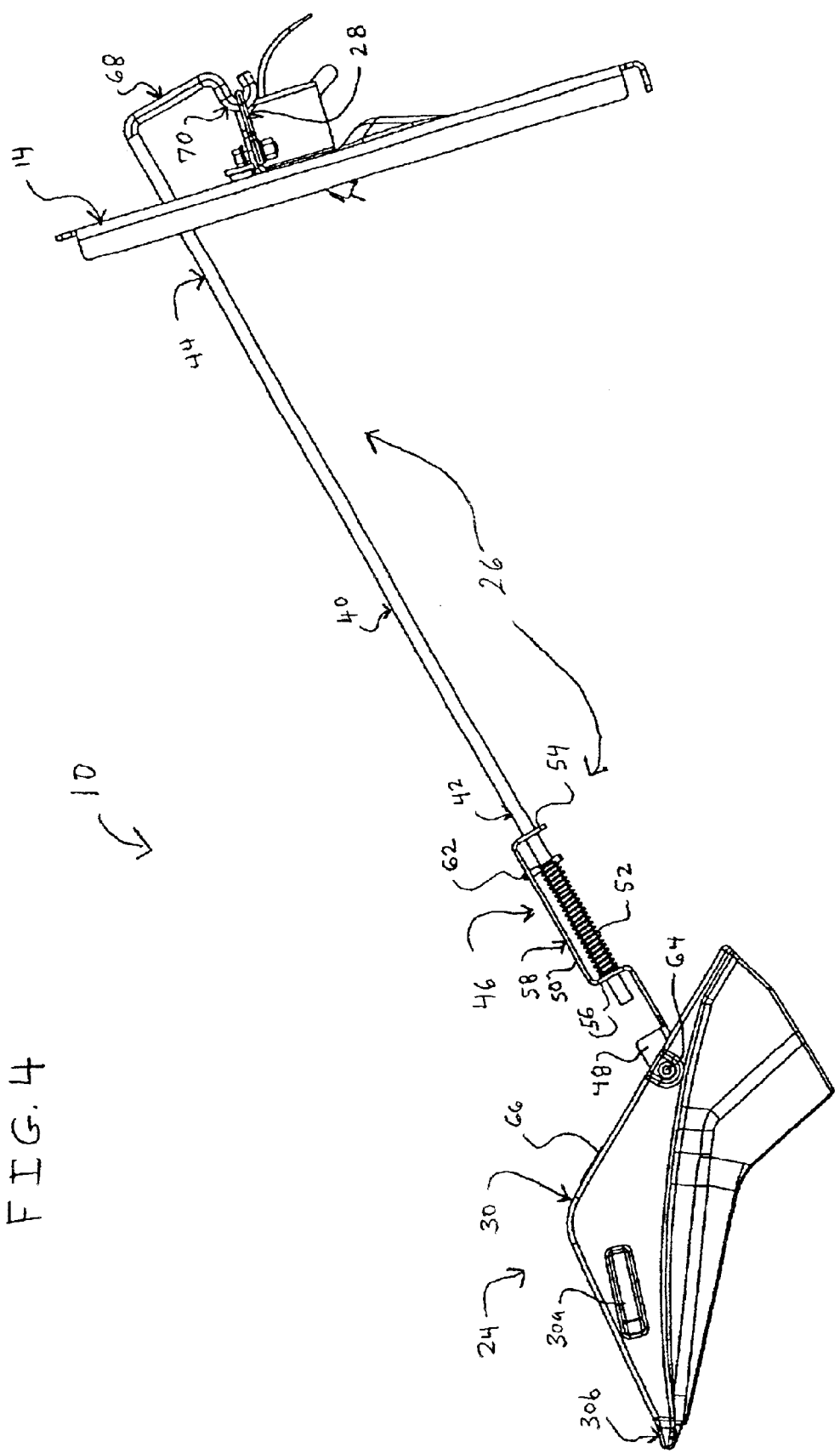
FIG. 4 is a side view of the discharge stopper unit in one embodiment of the present invention.

Referring to FIGS. 3 and 4, the discharge stopper unit 10, in one embodiment, includes: (a) a cover, plug, mulch plug or other discharge stopper 24 adapted to block the flow of material from the discharge opening 22; (b) an arm 26 connected (preferably pivotally) to the discharge stopper 24; and (c) a support member 28 adapted to be connected to the mowing machine frame 14. The discharge stopper 24 includes a body 30 and an arm positioning wall 32 which defines an arm positioning slot 34 for the arm 26. The discharge stopper 24 can include any object adapted to prevent, restrict or control the flow of material from the mower deck 16 through the discharge opening 22. The body 30 of the discharge stopper 24 preferably includes a plurality of guide members 30a and 30b which facilitate the proper alignment and placement of the discharge stopper 24 onto the mower deck 16. The guide members 30a and 30b co-act with and slidably engage the guide walls 20a and 20b of the mower deck 16 in order for the user to properly seat the discharge stopper 24 onto the mower deck 16 in a relatively quick and convenient manner. Preferably, the body 30 of the discharge stopper 24 includes a predetermined shape which facilitates the cutting or mulching of materials by the mower deck 16. It is also preferable that the body 30 is constructed of a suitable material such as a relatively hard rubber, plastic or polymer-based material. It should be appreciated that the body 30 can have any suitable shape, including without limitation, a convex shape, a concave shape, a relatively flat shape or an entirely flat shape. The discharge stopper 24 also includes hinge walls 36a and 36b which define hinged slots 38a and 38b for receiving the hinge pin 64 of the arm 26, as described below.

The arm 26 of the discharge stopper unit 10 includes an extension member 40 having a first end 42 which is pivotally connected to the discharge stopper 24 and a second end 44 which is adapted to engage support member 28. The first end 42 of arm 26 includes a biasing member 46 which biases the discharge stopper 24 onto the mower deck 16 and a hinge 48 which hingedly connects the arm 26 to the discharge stopper 24. The arm 26 extends through the discharge chute 18 with the second end 44 being positioned at the chute opening which otherwise communicates with a material collection unit or hopper (not shown). Though the arm 26 illustrated in FIGS. 1 to 4 is straight, it should be appreciated that in other embodiments the arm of the discharge stopper unit can have any suitable shape or structure, including, without limitation, curves or bends which facilitate the placement of the discharge stopper onto the mower deck.

The biasing member 46 includes a spring frame 50 which slidably receives the extension member 40 and is rigidly connected to the hinge 48. Biasing member 46 also includes a spring 52 which is received by extension member 40 and is held in place on spring frame 50 by extension member 40. The spring frame 50 includes an upper wall 54 and a lower wall 56, each of which defines an opening for slidably receiving the extension member 40. The spring frame 50 also includes a side wall 58 which defines a slot 60 and a spring pin 62, rigidly connected to the extension member 40, which slides back and forth in slot 60. Spring pin 62 and spring frame 50 co-act to prevent the spring 52 from extending beyond a predetermined length. In other words, the lower wall 56, the spring pin 62 and slot 60 ensure that the spring 52 will provide a minimum predetermined biasing force to the discharge stopper 24 at all times. This force secures the discharge stopper 24 to the mower deck 16, as described below. Though in this embodiment the biasing member 46 is included in the first end 42 of the arm 26, it should be appreciated that the biasing member of the discharge stopper unit can co-act with or be connected to arm 26 at any suitable location along arm 26 such as a location at or near the second end 44.

The hinge 48 connected to the biasing member 46 is rotatably mounted to hinge pin 64. Hinge 48 enables the arm 26 to be pivoted with respect to the discharge stopper 24. Preferably, when arm 26 is downwardly rotated, there is no angle between arm 26 and the plane of the upper surface 66 of discharge stopper 24, or such angle is relatively small. As described below, the arm 26 and the upper surface 66 of discharge stopper 24 being substantially in line with one another facilitates a user's installation of the discharge stopper unit 10 through the discharge chute 18 of the mower assembly 12.

The second end 44 of arm 26 includes a handle or extension member 68 connected to an engaging member 70 which removably engages support member 28. In this embodiment, the support member 28 is rigidly connected to the mowing machine frame 14 by two bolts 72. The engaging member 70 includes a guide portion or member 74, a guide portion or member 76 and a valley portion or member 78. The guide members 74 and 76 guide the placement of the extension member 68 on the support member 28 so that the valley portion 78 maintains contact with support member 28.

The U-shape or curve shape of engaging member 70 in this embodiment facilitates the removable engagement of arm 26 to support member 28. It should be appreciated, however, that in other embodiments, the engaging member of discharge stopper unit 10 can include any suitable structure, member, members or fastener which enables a user to removably connect and disconnect arm 26 from support member 28. For example, such engaging member can include a hook member, a clip member, a clasp member, a latch member, a notch, a pin and clip set, a bolt and nut set or any other suitable fastener or engaging member. It is also preferable that the support member 28 of discharge stopper unit 10 is rigidly connected to the mowing machine frame 14; however, it should be appreciated that the support member can be hingedly, pivotally, removably or otherwise suitably connected to mowing machine frame 14.

In order to convert a mowing machine from: (a) using the discharge chute to discharge cut material to the ground or into a collector to (b) depositing mulched or cut material from the mower deck onto the ground, the user must install the discharge stopper unit 10 in the mower assembly 12. To do so, the user first lowers the mower deck 16. Preferably, the user slides the discharge stopper 24 preferably under part 80, and the user fully inserts the discharge stopper 24 into and through the discharge chute 18. In other embodiments, before inserting the discharge stopper 24 through the discharge chute 18, the user may remove certain parts which obstruct the opening in the discharge chute 18. While gripping the handle or extension member 68, the user properly seats the discharge stopper 24 over discharge opening 22, with the assistance of guide walls 20a and 20b and guide members 30a and 30b.

Once the discharge stopper 24 is properly seated or positioned on the mower deck 16, the user pushes the handle or extension member 68 toward discharge stopper 24 and engages engaging member 70 with support member 28. At this point, the spring 52 generates a force which secures the discharge stopper 24 onto the mower deck 16. Discharge stopper 24 thus prevents the flow of material from discharge opening 22.

As the user operates the mowing machine, the mowing machine discharges cut material to the ground. It should be appreciated that the biasing member 46 has the capacity to increase and decrease in length while constantly producing a biasing force on the discharge stopper 24. Due to this function of the biasing member 46 and the pivotal connection of the arm 26 to the discharge stopper 24, the discharge stopper unit 10 maintains the proper seating of the discharge stopper 24 on the mower deck 16 despite the periodic raising and lowering of the mower deck 16, changes in the shape or slope of the terrain, and vibrations or bouncing of the mower deck 16.

In order to convert a mowing machine from mulching and depositing mulched material onto the ground directly from the mower deck to discharging cut material onto the ground or into a collector, the user must uninstall the discharge stopper unit 10 from the mower assembly 12. In operation of one embodiment, the user first lowers the mower deck 16. Lowering the mower deck 16 moves the discharge stopper 24 away from mowing machine frame 14 which decreases the compression force generated by spring 52. This decreased compression force generated by spring 52 makes it easier for the user who then handles extension member 68 and pushes the handle or extension member 68 in the direction of the discharge stopper 24. The user continues to push the handle or extension member 68 and simultaneously disengages engaging member 70 from support member 28. The user then pulls extension member 68 away from the mower deck 16. When the discharge stopper 24 is dislodged from the mower deck 16, the discharge stopper 24 preferably pivots downward until its upper surface 66 is substantially parallel with the arm 26. The user then continues to slide the discharge stopper unit 10 outwardly until the discharge stopper 24 is entirely removed from the discharge chute 18, preferably over or under part 80. At this point, the user may operate the mowing machine and discharge the cut material onto the ground or into a hopper.

In one embodiment, the mower assembly includes a discharge deflector (not shown) which directs the flow of discharge material onto the ground. Preferably, the discharge deflector is connected to the mowing machine frame so that the discharge deflector covers the outlet portion of the discharge chute. It is also preferable that the discharge deflector directs the flow of the cut material at a downward angle. The discharge deflector thus limits the degree to which the discharge material is projected into the air.

Figure 5:
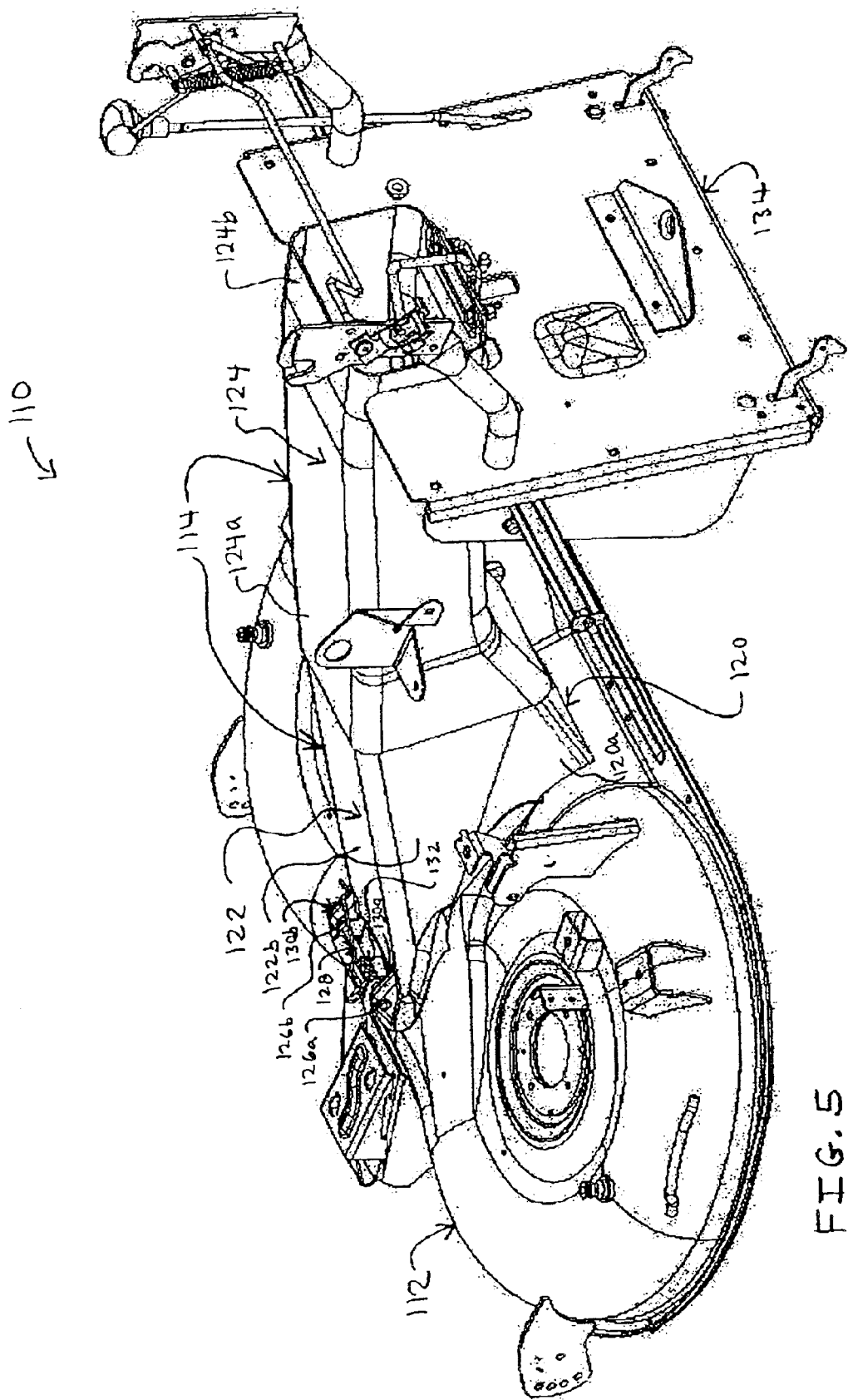
FIG. 5 is a perspective view of the mower assembly and the discharge chute illustrating the pivotable chute member and the fixed chute member in one embodiment of the present invention.
Figure 6:
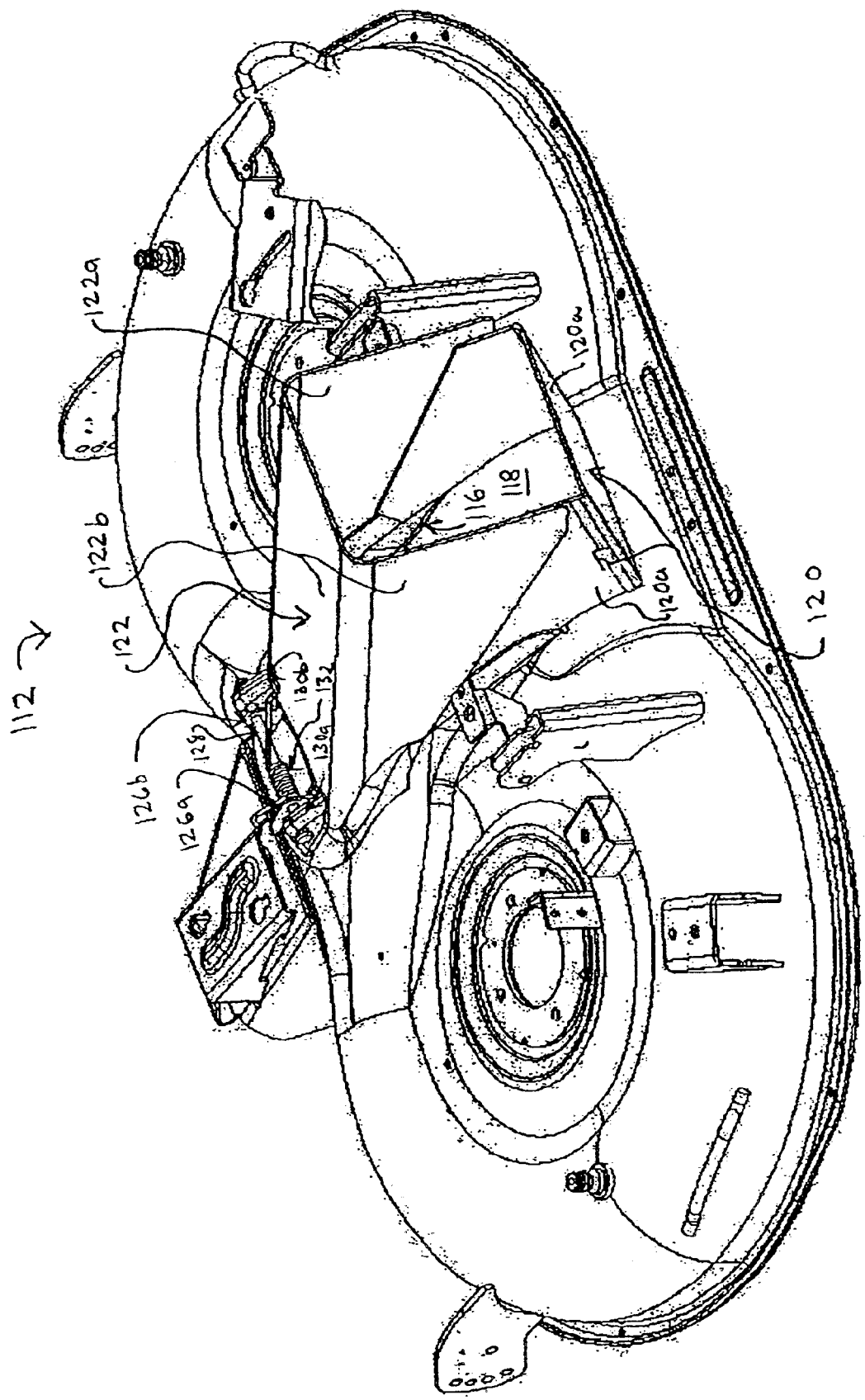
FIG. 6 is a perspective view of the mower assembly and pivotable chute member in one embodiment of the present invention.

In a preferred embodiment illustrated in FIGS. 5 and 6, the mower assembly 110 generally includes a mower deck 112 which cuts and mows grass, plants, leaves and other materials. The mower assembly 110 also includes a discharge chute 114 which directs the discharge material from the mower deck 112 to the rear of the mowing machine where the material can be discharged onto the ground or into a collector such as a bag or hopper (not shown). In this embodiment, the discharge chute 114 has a pivotal two-piece construction which enables the discharge chute 114 to adjust in response to the periodic raising and lowering of the mower deck 112 and operational vibrations.

The mower deck 112 includes a discharge wall 116, which defines a discharge opening 118, a chute support member 120 and one or more cutting blades (not shown). As the blades cut the material, the cut material flows through discharge opening 118 when discharge stopper unit 10 is not installed on the mower deck 112. The discharge wall 116 preferably includes guide walls (not shown) which assist the user in properly and quickly installing the discharge stopper unit 10 on the mower deck 112. The chute support member 120 is preferably rigidly connected to the discharge wall 116 and protrudes from the discharge opening 118 having a neck or collar shape. As described below, the chute support member 120 provides support for the pivotable chute member 122 and the fixed chute member 124, and the chute support member 120 also functions as a guide for the proper seating of the discharge stopper 24 on the mower deck 112.

The discharge chute 114 includes a pivotable chute member 122 which fits inside and co-acts with a fixed chute member 124. The pivotable chute member 122 is pivotally connected to the mower deck 112 with the inner wall 122a of the pivotable chute member 122 slidably engaging the outer wall 120a of the chute support member 120. Preferably, the pivotable chute member 122 is pivotally connected to the deck hinge members 126a and 126b. The deck hinge members 126a and 126b define openings for receiving the hinge pin 128. The pivotable chute member 122 has chute hinge members 130a and 130b which also receive the hinge pin 128, thereby pivotably connecting the pivotable chute member 122 to the mower deck 112. In addition, the pivotable chute member 122 includes a biasing member 132 which biases the pivotable chute member 122 against the mower deck 112. Preferably the biasing member 132 includes a suitable torsion spring coiled around the hinge pin 128, wherein the biasing member 132 engages a portion of the mower deck 112 and also engages the pivotable chute member 122.

The fixed chute member 124 has an inlet end 124a which fits over the pivotable chute member 122, and the fixed chute member 124 has an outlet end 124b which is preferably rigidly mounted to the mowing machine frame 134. The fixed chute member 124 is suitably sized to fit over the outer wall 122b of the pivotable chute member 122 for receiving discharge material from the pivotable chute member 122.

Preferably, the fixed chute member 124 extends over a suitable portion of the pivotable chute member 122 in order to accommodate for changes in the height of the mower deck 112 relative to the mowing machine frame 134. As the mower deck 112 raises and lowers, the pivotable chute member 122 pivots and slides upward or downward along the fixed chute member 124. Accordingly, the pivotable chute member 122 and the fixed chute member 124 co-act to enable the discharge chute 114 to increase and decreases in length in response to changes in the mower deck 112 height, while preventing the formation of openings or gaps in the discharge chute 114.

The discharge stopper unit of the present invention, in one embodiment, includes an arm which is pivotally connected to a discharge stopper. The arm is spring loaded or spring-activated which enables the user to conveniently install and uninstall the discharge stopper unit. The spring function of the arm provides a securing force which secures the discharge stopper to the mower deck and also ensures the proper seating of the discharge stopper over the discharge opening of the mower deck. This type of discharge stopper unit enables users to conveniently install and uninstall discharge stoppers onto mower decks, while reliably securing the discharge stopper to the mower deck.

It should be appreciated that the present invention includes any mowing machine which includes the discharge stopper unit. Such a mowing machine can include a frame, a suitable power unit supported by the frame, a suitable drive mechanism coupled to the power unit and a plurality of wheels rotatably connected to the frame. In one embodiment, such a mowing machine includes a mower assembly supported by the frame. The mower assembly includes: (a) a mower deck which defines a discharge opening; (b) a discharge stopper adapted to block the discharge opening; and (c) an arm, preferably spring-loaded, which has a first end and a second end. The first end is connected to the discharge stopper (preferably pivotally), and the second end is removably connected to a support member which is adapted to be connected to the frame.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A discharge stopper unit for a mowing machine having a mower deck which defines a discharge opening, the discharge stopper unit comprising:

a discharge stopper adapted to block the discharge opening; and an arm having a first end and a second end, the first end pivotally connected to the discharge stopper and the second end removably engagable with a portion of the mowing machine, the discharge stopper and the arm movable between: (a) a first position for stopping discharge wherein the discharge stopper is engaged with the mower deck and the second end of the arm is engaged with the portion of the mowing machine; and (b) a second position for enabling flow of discharge wherein the discharge stopper and the arm are disengaged from the mowing machine.

2. The discharge stopper unit of claim 1, wherein the arm is so positioned that the arm extends into a discharge chute of the mowing machine when the discharge stopper and the arm have the first position, the arm having a position substantially parallel to a longitudinal axis of the discharge chute.

3. The discharge stopper unit of claim 1, wherein the arm is a spring-loaded arm which biases the discharge stopper against the mower deck when the discharge stopper and the arm have the first position.

4. The discharge stopper unit of claim 1, wherein the arm has at least one biasing member adapted to produce a force biasing the discharge stopper against the mower deck when the discharge stopper and the arm have the first position.

5. The discharge stopper unit of claim 1, wherein the second end of the arm has an engaging member adapted to engage with the portion of the mowing machine.

6. A discharge stopper unit for a mowing machine having a mower deck which defines a discharge opening, the discharge stopper unit comprising:
   a discharge stopper adapted to block the discharge opening; and
   an arm having a biasing member operatively engaged with an extension member, the extension member having a first end pivotally connected to the discharge stopper and a second end, the second end having an engaging member removably engagable with a portion of the mowing machine, the discharge stopper and the arm movable between: (a) a first position for stopping discharge wherein: (i) the discharge stopper is engaged with mower deck; (ii) the second end of the arm is engaged with the portion of the mowing machine; and (iii) the biasing member biases the discharge stopper against the mower deck; and (b) a second position for enabling flow of discharge wherein the discharge stopper and the arm are disengaged from the mowing machine.

7. The discharge stopper unit of claim 6, wherein the first end of the extension member is hingedly connected to the discharge stopper.

8. The discharge stopper unit of claim 6, wherein the biasing member includes at least one spring.

9. The discharge stopper unit of claim 6, wherein the engaging member has at least one guide member.

10. The discharge stopper unit of claim 6, wherein the engaging member has a fastening member.

11. The discharge stopper unit of claim 6, wherein the discharge stopper has at least one guide member to facilitate guidance of the discharge stopper into the first position.

12. A mower assembly for a mowing machine, comprising:
   a mower deck which defines a discharge opening;
   a discharge chute in communication with the discharge opening;
   a discharge stopper; and
   an arm connected to the discharge stopper, the arm having a first end and a second end, the first end pivotally coupled to the discharge stopper, the discharge stopper and the arm movable between:
      (a) a first position for stopping discharge wherein: (i) a portion of the arm has a position inside the discharge chute, said position being substantially parallel to a longitudinal axis of the discharge chute; (ii) the discharge stopper is engaged with the mower deck; and (iii) the second end of the arm is engaged with a portion of the mowing machine; and
      (b) a second position for enabling flow of discharge wherein the discharge stopper and the arm are disengaged from the mowing machine.

13. The mower assembly of claim 12, wherein the arm is hingedly connected to the discharge stopper.

14. The mower assembly of claim 12, wherein the arm has at least one biasing member adapted to produce a force biasing the discharge stopper against the mower deck when the discharge stopper and the arm have the first position.

15. The mower assembly of claim 12, wherein the arm has an engaging member adapted to engage with the portion of the mowing machine.

16. The mower assembly of claim 15, wherein the engaging member has at least one guide member.

17. The mower assembly of claim 15, wherein the engaging member has a fastening member.

18. The mower assembly of claim 12, wherein the mower deck is a rear discharge mower deck.

19. The mower assembly of claim 12, wherein the mower deck has a discharge wall which defines the discharge opening.

20. The mower assembly of claim 19, wherein the discharge wall has at least one guide member to facilitate guidance of the discharge stopper into the first position.

21. The mower assembly of claim 20, wherein the discharge stopper has at least one guide member which co-acts with the guide member of the discharge wall to facilitate guidance of the discharge stopper into the first position.

22. A mowing machine comprising:
   a frame;
   a power unit supported by the frame;
   a drive mechanism coupled to the power unit;
   a plurality of wheels rotatably connected to the frame; and
   a mower assembly supported by the frame, the mower assembly having a mower deck which defines a discharge opening, a discharge chute in communication with the discharge opening, a discharge stopper, and an arm connected to the discharge stopper, the arm having a first end and a second end, the first end pivotally coupled to the discharge stopper, the discharge stopper and the arm movable between:
      (a) a first position for stopping discharge wherein: (i) a portion of the arm has a position inside the discharge chute, said position being substantially parallel to a longitudinal axis of the discharge chute; (ii) the discharge stopper is engaged with the mower deck; and (iii) the second-end of the arm is engaged with a portion of the mower deck; and
      (b) a second position for enabling flow of discharge wherein the discharge stopper and the arm are disengaged from the mowing machine.

23. The mowing machine of claim 22, wherein the arm is hingedly connected to the discharge stopper.

24. The mowing machine of claim 22, wherein the arm has at least one biasing member adapted to produce a force biasing the discharge stopper against the mower deck when the discharge stopper and the arm have the first position.

25. The mowing machine of claim 22, wherein the second end of the arm has an engaging member adapted to engage with the portion of the mowing machine.

26. The mowing machine of claim 22, wherein the mower deck is a rear discharge mower deck having a position which is adjustable relative to the frame.

27. A method of stopping material from discharging from a discharge opening defined by a mower deck of a mowing machine, the mowing machine including a discharge chute having a first end in communication with the discharge opening and a second end, the method comprising the steps of:

(a) grasping an arm pivotally coupled to a discharge stopper;

(b) lifting the arm and the discharge stopper from a first position;

(c) inserting the discharge stopper into the discharge chute;

(d) using the arm to move the discharge stopper from the second end to the first end of the discharge chute;

(e) positioning the discharge stopper on the mower deck so as to block the discharge opening;

(f) pushing the arm in a direction of the discharge stopper;

(g) engaging the arm with a support member coupled to the mowing machine; and (h) releasing the arm thereby biasing the discharge stopper against the mower deck.

28. The method of claim 27, wherein step (f) includes the step of compressing at least one spring which co-acts with the arm.

29. The method of claim 27, wherein step (h) includes the step of enabling an extension of at least one spring which co-acts with the arm.

30. The mowing machine of claim 22, wherein the portion of the mowing machine includes a support member coupled to the frame.

31. A discharge stopper unit for a mowing machine having a mower deck including at least one discharge wall which defines a discharge opening, the mowing machine further including an elongated discharge chute in communication with the discharge opening, the discharge chute having a first chute end and a second chute end positioned along a longitudinal axis, the discharge stopper unit comprising:

an arm having a first arm end, a second arm end and an extension member positioned between the first arm end and the second arm end, the extension member having a length sufficient to enable the first arm end to have a position adjacent to the first chute end and the second arm end to have a position adjacent to the second chute end while the extension member has a position inside the discharge chute substantially parallel to the longitudinal axis; and a discharge stopper pivotally coupled to the first arm end, the discharge stopper including at least one guide member having at least one surface adapted to slidably engage with the discharge wall of the mower deck wherein the guide member is operable to guide positioning of the discharge stopper on the mower deck.

32. The discharge stopper unit of claim 31, wherein the arm has a length which is equal to or greater than a length of the discharge chute.

33. The discharge stopper unit of claim 31, wherein the guide member is integral with the discharge stopper.

34. The discharge stopper unit of claim 31, wherein the discharge stopper has a plurality of guide members each of which has at least one surface adapted to slidably engage at least one of a plurality of guide walls connected to the discharge wall.

* * * * *